United States Patent Office 3,065,216
Patented Nov. 20, 1962

3,065,216
PROCESS FOR POLYMERIZATION OF MONO-
MERIC MONOOLEFINS
Yoshio Tsunoda, Tokyo, and Sumio Fujimoto, Itsuho
Aishima, and Yuji Kobayashi, all of Nobeoka-shi,
Japan, assignors to Asahi Kasei Kogyo Kabushiki Kai-
sha, Osaka, Japan, a corporation of Japan
No Drawing. Filed May 27, 1960, Ser. No. 32,132
Claims priority, application Japan June 20, 1959
16 Claims. (Cl. 260—93.5)

The invention relates to a new polymerization process and products thereby obtained. More particularly this invention relates to a process for the polymerization of monomeric monoolefins in the presence of novel catalysts and polymerization products thereby obtained.

Various methods have been proposed heretofore for the production of polymers of monoolefins, and recently heterogeneous catalytic polymerization methods have been developed in order to obtain linear polyethylene, crystalline polypropylene or crystalline polystyrene. As one of typical methods, it has been delineated in K. Ziegler's Japanese Patent No. 233,145 (Pub. No. 1,545/57) that a high molecular linear polyethylene can be produced by polymerization of ethylene in the presence of a catalyst comprising a mixture of trialkyl aluminum with a compound of a metal of the groups IV–A, V–A and VI–A in the periodic table, particularly including titanium, zirconium, chromium, thorium and uranium. As another method it was delineated in Ziegler and Natta's Japanese Patent No. 251,846 (Pub. No. 10,596/57) that a high molecular weight linear polymer can be produced by polymerization of monoolefin having at least three carbon atoms in an organic inert solvent in the presence of a catalyst obtained through the reaction of a compound of a metal of groups IV–A, V–A and VI–A in the periodic table with a metal of groups II and III in the periodic table or the alloy thereof, or the hydride or organo-metallic compound of a metal of groups I, II and III in the periodic table. These methods are principally characterized in that the organo-metallic compound is used together with the halide of a metal of groups IV–A, V–A and VI–A in the periodic table, and for instance, an organo-metallic compound soluble in solvents is reacted with titanium tetrachloride thereby forming an insoluble, catalytically active compound, which may be considered as having the great significance as a heterogeneous catalyst for the formation of crystalline polymeric monoolefins. Thus the heretofore known methods for the production of crystalline high polymers of monomeric monoolefins can be roughly classified to three groups which are characterized by using the catalysts (1), (2) and (3) respectively:

(1) The catalyst comprising a metal of groups I, II and III in the periodic table or the alloy, hydride or organo-metallic compound thereof and the halide of a metal of groups IV–A, V–A and VI–A in the periodic table;

(2) The catalyst comprising silica and alumina together with the higher oxide of chromium; and (3) The catalyst comprising an alkali and alkaline earth metal or the hydride thereof and the oxide of a metal of groups V–A and VI–A and molybdenum or nickel (cf. Japanese Patent Pub. No. 3,893/58, Japanese Patent Pub. No. 4,095/58, U.S.P. 2,692,257 and U.S.P. 2,717,889). That is, these three methods require the individually particular combinations as catalysts.

The use of a metal itself of groups IV–B, V–B and VI–B in the periodic table as catalyst for the polymerization of monoolefin has never been expected by the prior art. Indeed, it was known that the compound, e.g. oxide, of a metal of groups IV–B, V–B and VI–B in the periodic table can be used for the polymerization of ethylene or a catalyst consisting of tetraethyl lead and titanium chloride can be effective in such a method as described in Japanese Patent Pub. No. 4,588/58. Generally speaking, however, when a catalyst comprising an organo-metallic compound of a metal of groups IV–B, V–B and VI–B in the periodic table, an organic halide and an inorganic salt is used, only a solid telomer can be obtained (as shown in Japanese Patent Pub. No. 5,138/58).

As a method in which a catalyst comprising a metal of groups I, II and III in the periodic table or the alloy thereof and the compound of a metal of groups IV–A, V–A and VI–A in the periodic table is used instead of the abovesaid dangerous organo-metallic compounds, there has been known only one example which shows the production of crystalline polypropylene by the polymerization of propylene in the presence of a catalyst comprising aluminum-magnesium alloy and titanium tetrachloride (cf. Japanese Patent Pub. No. 10,596/57 and Pub. No. 8,446/57). In the method stated just above, however, it is necessary that in order for the successful production of crystalline polypropylene, the mixture of both said catalytic components prior to the use as catalyst is vigorously ground in an inert atmosphere by mechanical means for a long time until titanium tetrachloride is reduced and a transparent, liquid mass free of titanium tetrachloride is obtained. Accordingly these methods are not suitable for the commercial scale production of crystalline polymers from monomeric monoolefins. In the prior art, additionally speaking, the aforesaid aluminum-magnesium alloy should be shaved by means of a shaving tool particularly designed for the intended purpose, and then the shaven waste is necessarily ground together with titanium tetrachloride in an inert atmosphere by means of a ball mill for a long time, thereby resulting a ground mass which serves as catalyst. Moreover, the catalyst should be treated in an inert atmosphere and the produced polymer can be separated from the catalyst system with difficulties. These are the reasons why the continuous process for the catalyst preparation as well as monoolefin polymerization cannot be accomplished heretofore without difficulties.

The method of the present invention can overcome all of the disadvantages from which the prior art is suffered, and the present method includes the production of a crystalline polymer by the polymerization of monolefin in the presence of a catalyst consisting of the following components (1) and (2), or (1), (2) and (3).

(1) At least one metal selected from the group consisting of tin, lead, bismuth and tellurium (which belong to groups IV–B, V–B and VI–B in the periodic table) together with magnesium, dissolved or suspended in mercury.

(2) At least one member selected from the group consisting of the tri- and tetrachlorides of titanium, zirconium, vanadium and chromium (which belong to Groups IV–A, V–A and VI–A in the Periodic Table of Mendeleyev).

(3) At least one member selected from the group consisting of the lower monohaloalkyls and bromobenzene.

The main object of the invention is to make possible the use of a system having been considered as unapplicable for the polymerization of monomeric monoolefins. Another object of the invention is to provide a novel method for the production of a crystalline high polymer from monomeric monoolefin. Still another object of the invention is to provide the continuous manufacturing process of monoolefin high polymers with technical advantages.

The first characteristic of the invention resides in the above specified novel catalyst system. In the invention, certain metals and the alloys or mixtures thereof can be used as catalyst instead of complex organo-metallic compounds or metallic hydrides. In the present catalyst system tin, lead, bismuth or tellurium may be used. These metals which belong to groups IV–B, V–B and VI–B in the periodic table unexpectedly show catalytic activity in numbers of tests. All the components of the present catalyst system are readily available under market, and they may be handled without care, whereas the triethyl aluminum or the like organo-metallic compound should be treated under a strictly oxygen- and moisture-free condition.

The second characteristic of the present invention resides in the use of a certain metallic component in the dissolved or suspended state in mercury. The metallic component usually may be solid at a temperature applied, and if said component is used as it is, the effective use of each component or the preparation of an active catalyst cannot be assured. In this case, such arrangements as in the abovesaid arts (Japanese Patent Pub. No. 10,596/57 and Japanese Patent Pub. No. 8,446/57) are required. In the invention, on the other hand, a selected metal or the alloy thereof is mixed or dissolved with mercury by slightly heating if need, thereby forming a liquid mass, which can always provide fresh active surface by slow agitation. Then the mass is combined with the component (2) or the components (2) and (3) to have a desired catalyst system. Thus a catalyst system used herein can be prepared only by mechanical agitation for a short time, and therefore it is possible to prepare the system in a reaction vessel and/or in the presence of monomeric monoolefin prior to or during the polymerization. Additionally speaking, it is unnecessary to carry out the preparation of the present catalyst system under oxygen free conditions.

It is not obvious why the present catalyst system can be safely prepared even under oxygen atmospheric conditions. But it may be supposed as follows: As described in the known publications (cf. Japanese Pat. Pub. No. 8,446/57 and Pub. No. 46/58), titanium halide, e.g. titanium tetrachloride, would be used as catalyst under such conditions that the whole or major part of said chloride has been reduced to trivalent or its lower state, whereas in the present invention titanium halide, e.g. titanium tetrachloride, is dissolved as it is in an inert solvent as polymerization medium and certain metals, e.g. lead and magnesium, are dissolved in mercury, whereby at the surface between the inert solvent phase and the mercury phase a fresh catalytically active mass is continuously formed with effecting the desired polymerization.

In the present invention it is also possible during polymerization to separate a part of the mercury phase and then add the tri- or tetrachloride of titanium, zirconium, vanadium or chromium thereto thereby initiating polymerization newly. It is also possible to adjust the degree of polymerization or to control the rate of polymerization by the portionwise addition of said halide dependent on the progress of the polymerization. Further it is possible to add a chosen metal or the alloy or mixture thereof in finely powdered or roughly crushed or bulky state or the suspension in an inert solvent or the solution in mercury to a reaction vessel during polymerization to continue the polymerization. Comprehensively, a catalyst consisting of the mercury phase and said halide is used to initiate the polymerization of monomeric monoolefin, and thereafter additional catalytic components, monomeric monoolefin and a solvent are continuously introduced into the polymerization system in the course of the polymerization, while the reaction product containing a desired polymer is optionally removed from the polymerization. The continuous polymerization process can be established according to the invention. The multiplicities of the present method may be referred to the third charactertistic of the invention.

The most remarkable characteristic, the fourth, in the present invention resides in that almost all parts of the mercury having been used as one portion of the present catalyst can be separated or recovered from the reaction product after completion of the polymerization. After the polymerization or even during the polymerization, if the polymerization system is slowly agitated, the system is divided to the inert solvent phase (containing a desired polymer) and the mercury phase. From the system, the mercury phase can be recovered directly or after decomposition of the catalyst using methanol or the like lower aliphatic alcohol. Especially when approximately all of the metal part dissolved in mercury has been consumed in the polymerization reaction, the separation between said inert solvent phase and said mercury state will be so extremely easy that substantially all mercury can be recovered.

As will be understood from these characteristics, the invention is entirely different from the prior arts (Japanese Patent Pub. No. 8,446/57 and Pub. No. 10,596/57).

In order for carrying out the preparation of the present catalyst system in practice, an inert solvent may be preferably used. The inert solvent also serves as polymerization medium. Among suitable inert solvents are included n-hexane, n-heptane, benzene, toluene and other aliphatic or aromatic hydrocarbons having a boiling point of less than 150° C. If a liquid olefin is used as monomer to be polymerized, the preparation of the present catalyst system may be carried out in said liquid olefin.

A crystalline monoolefin polymer obtained by the present invention assumes white grey or dark grey because of the inclusion of the remaining catalyst residue. When such polymer is washed with hot methanol-hydrochloric acid or hot methanol-nitric acid, the polymer is completely freed from even the trace of mercury so that a white, solid polymer is obtained.

In the polymerization of monomeric monoolefin according to the invention, polyethylene, polypropylene and polystyrene are produced respectively from ethylene, propylene and styrene. The infrared spectrum of the thus produced polyethylene shows that of typically straight chain polyethylene. The n-heptane-insoluble part of the polypropylene obtained herein gives the spectrum of typical isotactic polypropylene. These polymers have good regular structure and are highly crystalline. They can be extruded in the molten state to produce films, filaments and shaped articles, which have relatively high softening point, good mechanical strength and high chemical resistance.

Now the present invention will be explained with reference to the following one embodiment: In an autoclave with the inner volume of 300 cc., 0.35 g. of magnesium and 1.6 g. of lead are dissolved into 40 g. of mercury. Then the resulted solution is added with 3.5 g. ethyl bromide and 0.3 g. titanium tetrachloride dissolved in 40 cc. n-hexane and the autoclave containing the total mixture is cooled to −80° C. Into the autoclave 21 g. of propylene are introduced, and immediately thereafter the temperature is raised to 80° C. and stirring is started. The pressure for polymerization reaches 13 kg./cm.$^2$, but decreases to 1 kg./cm.$^2$ within three hours. Subsequently, 21 g. of propylene is forced into the autoclave, and the reaction is continued. After three hours, the pressure decreases again 2.5 kg./cm.$^2$. Further 21 g. of propylene is forced therein. Over a total period of 4 hours, stirring is effected at 80° C. The pressure at that time is 2.0 kg./cm.$^2$. After completion of the polymerization, 100 cc. of methanol is introduced into the autoclave thereby to effect the decomposition of the catalyst residue. Contents in the autoclave are then transferred into a 500 cc.-volume separation funnel. 150 cc. of methanol are added thereto and the mixture is slowly stirred thereby to separate the polymerizate from the mercury phase which is then removed. The methanolic solution containing the polymerizate is filtered, and the recovered white grey polymerizate together with 150 cc. of methanol-hydrochloric acid (30%) is refluxed (by means of a reflux condenser) at a boiling point for three hours, and then the same procedure is repeated using methanol-nitric acid (10%). After washing and drying, 60.5 g. of pure white propylene polymer are obtained, which have the polymerization conversion 96%. The ether extract residue of the polymer is 52% and its viscosity number is 1.15 (in term of $\eta_{sp/c}$ in 0.1% tetraline solution at 135° C.), corresponding to an average molecular weight of about 45,000. The softening point of the polymer is found to be 170° C. by microscopic observation, and it can be extruded at 240° C. to filaments, which after heat stretching shown good mechanical properties, e.g. tensile strength of 4.2 g./d. and tensile elongation of modulus 57%. The separated mercury phase is washed with dilute nitric acid and then purified by vacuum distillation. By these procedures, almost all parts of the mercury used can be recovered.

Among metals of groups IV–B, V–B and VI–B in the periodic table, tin, lead, bismuth and tellurium are effective for the purpose of the invention, and tin, lead and tellurium are particularly recommended. These metals may be used individually, and the alloys of them with magnesium may be likewise. The latter is preferred because of the advantage in processing, e.g. pulverizing, mixing or the like.

As to the halides of metals of groups IV–A, V–A and VI–A in the periodic table, the tri- and tetrachlorides of titanium, zirconium, vanadium and chromium are preferred, and both titanium tetrachloride as well as titanium trichloride are most preferred.

In the catalyst system of the present invention, 0.1 to 10 moles of magnesium and preferably 1 to 5 moles are suitable per one mole of a metal selected from the group consisting of tin, lead, bismuth and tellurium. Also 0.1 to 10 moles of a member selected from the group consisting of the tri- and tetrachlorides of titanium, zirconium, vanadium and chromium are suitable per mole of the metal selected from the group consisting of tin, lead, bismuth and tellurium.

The mercury used in the present catalyst system may be in an amount within the wide range provided that it is sufficient to dissolve or suspend a small portion of a certain metal chosen. Even though the mercury is used in an insufficient amount of dissolving the whole portion of a metal used, the mercury can act recurrently with the progress of the polymerization thereby to accomplish the intended purpose. Although it is not only difficult but also unnecessary to define the amount of mercury to be used, it is supposed that the weight ratio of said mercury to the total amount of a metal selected from the group consisting of tin, lead, bismuth and tellurium, together with magnesium may be 0.1 to 500 times.

As to alkyl halide or araryl halide used herein, monohalides of aliphatic hydrocarbons with 1 to 4 carbon atoms are particularly suitable, and ethyl bromide is most preferred. Bromo-benzene is also applied to the same purpose. The amount of said halide may vary within a very wide range unless it is too excessive to inhibit the reaction. In practice, the halide may be used in amount of less than 10 moles per one mole of a metal selected from the group consisting of tin, lead, bismuth and tellurium.

In order to effect smooth polymerization of the invention, the total amount of individual catalytic components other than mercury should be 0.0001 to 10 times by weight of the monomer to be polymerized.

The time or the order of the addition of individual catalytic components may be optional. In any case, sufficient stirring is required to have a uniform mixture. In order to assure mixing said metals with said chlorides of metals may be effected groups IV–A, V–A and VI–A in the periodic table may be effected in the presence of monomeric monoolefin or followed by contacting with the monomeric monoolefin immediately after said mixing.

As to polymerizable monomers used herein, ethylene, propylene, butene-1 and other monoolefin of less than 6 carbon atoms and styrene are included. Particularly ethylene and propylene are suitable for the production of crystalline solid polymers.

In the presence of the present catalyst, a desired polymerization reaction can take place even at a room temperature. But in practical sense, a temperature of 30° to 150° C. and especially 50° to 120° C. is preferred. A pressure applied may be atmospheric pressure or superatmospheric pressure as high as 60 kg./cm.$^2$.

In the following table, the activities of metals of groups IV–B, V–B and VI–B in the periodic table and alkyl halides are clarified in comparison with the examples disclosed in the prior arts (Japanese Patent Pub. No. 8,446/57, Pub. No. 10,596/57, Pub. No. 84/58 and Pub. No. 4,588/58).

|  |  | Japanese Patent Pub. No. 8,446/57 | Japanese Patent Pub. No. 10,596/57 | Japanese Patent Pub. No. 46/58 | Japanese Patent Pub. No. 4,588/58 |
|---|---|---|---|---|---|
| Composition of catalyst | | Al$_2$Mg$_3$, TiCl$_4$, n-hexane. | Al$_2$Mg$_3$, TiCl$_4$, n-hexane. | Aluminum sand, TiCl$_4$, dry benzene. | Tetraethyl lead, 4 cc; titanium trichloride 3 g.; n-hexane 100 cc. |
| Preparation of catalyst | | Reduction by grinding in a ball mill for 24 hrs. | Reduction by grinding in a ball mill for 36 hrs. | Reduction at 200° C. in a sealed tube for 8 hrs. | Introducing the mixture of tetraethyl lead and titanium trichloride into an autoclave. |
| Monomer | Type | Ethylene | Propylene | Ethylene | Propylene. |
|  | Amount | Unknown | 790 g | 249 g | 150 cc. |
| Polymerization condition | Temp. | 40° C | 80° C | 40° C | 120° C. |
|  | Press. | Atmospheric | | 60 atm | |
|  | Time | 2 hrs | 50 hrs | 12 hrs | 20 hrs. |
| Polymerization conversion rate | | Solid polymer | 83.5% | Solid polymer 68.2% | 2.6%. |
| Viscosity number ($\eta_{sp}/c.$) | | Molecular weight 480,000. | | | |
| Crystalline polymer | | | | | |

|  | Control | | | The present invention | | |
|---|---|---|---|---|---|---|
| Composition of catalyst | Magnesium, 0.700 g.; mercury, 200 g.; ethyl bromide, 6.5 g.; titanium tetrachloride, 1.9 g.; n-hexane, 100 cc. | Magnesium, 0.198 g.; mercury, 40 g.; ethyl bromide, 12.4 g.; titanium tetrachloride, 0.88 g.; n-hexane, 150 cc. | Magnesium, 0.35 g.; mercury, 40 g.; ethyl bromide, 3.5 g.; titanium tetrachloride, 0.3 g.; n-hexane, 150 cc. | Magnesium, 1.4 g.; lead, 5.0 g.; mercury, 500 g.; titanium tetrachloride, 1.9 g.; n-hexane, 150 cc. | Lead-magnesium alloy, 1.65 g.; mercury, 500 g.; ethyl bromide, 16.4 g.; titanium tetrachloride, 228 g.; n-hexane, 150 cc. |
| Preparation of catalyst | Shaking in a sealed tube at a room temperature for 30 min. | Shaking in a sealed tube at a room temperature for 30 min. | Mixing in a reaction vessel. | Shaking in a sealed tube at a room temperature for 30 min. | Shaking in a sealed tube at a room temperature for 90 min. |
| Monomer — Type | Ethylene | Propylene | Propylene | Ethylene | Ethylene. |
| Monomer — Amount | 87.5 g | 12 g | 68 g | 37.5 g | 87.5 g. |
| Polymerization condition — Temp | 60° C | 80° C | 80° C | 60° C | 60° C. |
| Polymerization condition — Press | Atmospheric | 11 atm. max | 15 atm. max | Atmospheric | Atmospheric. |
| Polymerization condition — Time | 4 hrs | 40 hrs | 10 hrs | 4 hrs | 4 hrs. |
| Polymerization conversion | 15.2% | 42.3% | 96% | 8.4% | 68.3%. |
| Viscosity number | 0.65 | 2.65 | 1.65 | 0.55 | 0.7. |
| Crystalline polymer | | 19% | 52% | | |

Since the specifications of Japanese Patent Pub. No. 10,596/57 and Pub. No. 8,446/57 have no example wherein magnesium metal singly was used, we must refer to the examples wherein aluminum-magnesium alloy was used. In the example of the present invention, a catalyst comprising magnesium metal, ethyl bromide and titanium tetrachloride in the presence of mercury was used. In the present example there was obtained highly superior result to that of the examples of the prior arts. For instance, when magnesium metal singly (using no other metals) in combination with ethyl bromide was used as catalyst, the polymerization of propylene at 80° C. for 40 hours resulted in only 42.3% of the polymerization conversion. Whereas, in the present invention employing lead-magnesium, the polymerization conversion reached 96%. Moreover, the ether-insoluble part that means crystalline polymerizates was 19% in the former example and 52% in the latter. These facts mean that the joint use of lead, a metal of group IV–B in the periodic table, has a great significance of the polymerization of monoolefin monomer.

Further, in comparison of the example (Japanese Patent Pub. No. 4,588/58) employing organo-lead compound with the example of the present invention, the former gave the polymerization conversion of 26% after the polymerization at 120° C. for 20 hours, while the latter gave 96% after the polymerization at 80° C. for 10 hours. This shows the entire difference between the catalysts of both the examples. When tetraethyl lead is used in the former example, a polymerization temperature should be within the range of from 90° to 180° C. and preferably from 120° to 150° C., as described in the said specification, while the catalyst of the present invention is particularly active at 50° C. to 120° C.

The following examples describe certain ways in which the principle of the invention has been applied, but are not to be construed as limiting its scope.

Example 1

Into a 300 cc. autoclave, 1.6 g. of lead and 0.35 g. of magnesium, dissolved in 40 g. of mercury, were introduced, and then 3.5 g. of ethyl bromide and 0.3 g. of titanium tetrachloride 40 cc. of n-hexane were added thereto. The autoclave containing the mixture was cooled to −80° C. and 21 g. of propylene was condensed therein. Immediately thereafter it was heated to 80° C. and the stirring was started. An initial pressure was 13 kg./cm.$^2$ but three hours after, became 1.0 kg./cm.$^2$. Subsequently 21 g. of propylene was introduced into the autoclave to continue the polymerization. After further three hours, the pressure decreased again to 2.5 kg./cm.$^2$. Additionally 21 g. of propylene was forced to continue to polymerization. Stirring was maintained at 80° C. over 4 hours. At the end of the polymerization, the pressure decreased to 2.0 kg./cm.$^2$.

After completion of the polymerization, 100 cc. of methanol was forced into the autoclave thereby to decompose the catalyst. The contents of the autoclave were transferred into a 500 cc. volume separation funnel. 150 cc. of methanol was added, and the mixture was slowly stirred to separate the mercury and the polymerizate. The mercury phase was removed. Then the methanolic solution bearing the polymerizate was filtered. The recovered white grey polymerizate, together with 150 cc. of methanol-hydrochloric acid (30%), was refluxed (by means of a reflux condensor) at a boiling temperature for three hours, and the same procedure was repeated using methanol-nitric acid (10%) instead of said methanol-hydrochloric acid. After washing and drying, 60.5 g. of a snow white polymerizate was obtained. The ether-extract residue of the polymerizate was 52%, and its viscosity number was 1.15 ($\eta_{sp/c}$ in a 0.1% tetraline solution at 135° C.). This polymerizate was extruded at 240° C. to produce filaments which after hot stretching, showed good mechanical properties, e.g. tensile strength of 4.2 g./d., tensile elongation of 57%.

The separated mercury was washed with dilute nitric acid and then purified by vacuum distillation. Almost all parts of the mercury used could be recovered.

Example 2

In a 200 cc. volume glass ampule, 5.0 g. of finely powdered lead-magnesium alloy (Pb: 80%; Mg: 20%) were dissolved in 200 g. of mercury, and then 8.2 g. of ethyl bromide dissolved in 40 cc. of n-hexane were added thereto. The ampule was sealed and subjected to shaking at 60° C. for 2 hours. At that time, the ampule was opened, and the contents were transferred into a 1000 cc. volume, four necked flask equipped with a stirrer, a thermometer and a Dimroth cooler. Then, 1.3 g. of titanium tetrachloride dissolved in 250 cc. of n-hexane were added, and stirring was started. The polymerization of ethylene blown into the catalyst mixture at a presure of 40 mm. Hg. was initiated whilst maintaining a reaction temperature of 60° C. At about five minutes after the blowing, unreacted ethylene was hardly detected in the exhaust reactant gas. At about seven minutes, the polymerizate attached on the glass wall was observed. Thirty minutes after the initiation of the reaction, 200 cc. of n-hexane was added with the intention of maintaining the sufficient stirring of the slushy contents. At three hours after the initiation of the reaction, sampling of n-hexane phase in which a polymer was present in its suspension state. Correspondingly to said sampling, the titanium tetrachloride solution in n-hexane and the lead-magnesium alloy suspended or sedimented in n-hexane were introduced by their gravity flow. The amounts of the titanium tetrachloride and the lead-magnesium alloy added in the course of polymerization were 0.6 g. and 2.5 g. respectively. For convenience of sampling (that is, to suppress the undesired increase of the viscosity of n-hexane phase), 500 cc. of n-hexane was added in four portions to the reaction mixture during further three hours. Thus, the n-hexane phase in the polymerization system was maintained in amount of at least 500 cc. throughout the polymerization reaction. The resultant polymerizate was worked up in the same manner as described in Example 1. When the polymerizations were continued over 48 hours and 72 hours at the feed ratio of ethylene of 11.6 l./hr. (N.T.P.), white polymers obtained were 474 g. and 701 g. respectively, and the polymerization conversions were 68.3% and 67.4% respectively. The viscosity number of the resulted polymer was 0.59.

*Example 3*

Into a 200 cc. volume glass ampule, 1.4 g. of magnesium and 5.0 g. of lead dissolved in 500 g. of mercury were charged, and 1.9 g. of titanium tetrachloride dissolved in 150 cc. of n-hexane was added thereto. The ampule was sealed and shaken at 60° C. for thirty minutes. Then the contents of the ampule were transferred into a 500 cc. volume four necked flask equipped with a thermometer, a Dimroth cooler and a stirrer. The polymerization was carried out at the ethylene feed rate of 11.6 l./hr. (N.T.P.) at 60° C. At four hours after initiation of the polymerization, methanol was added to the polymerization system to separate the mercury. Then, the polymerization product having been separated from the mercury was boiled with methanol-hydrochloric acid and methanol-nitric acid. The resultant polymer was white solid, the polymerization conversion was 8.4%, and the viscosity number of the polymer was 0.55.

*Example 4*

6.3 g. of tin-magnesium alloy (Sn, 70%; Mg, 30%) was dissolved in 200 g. of mercury, and then 100 cc. of n-hexane and 2.3 g. of ethyl bromide were added thereto. The mixture was shaken in the sealed ampule at 60° C. for 3 hours, and thereafter the contents were transferred into a 500 cc. volume four-necked flask. Into the flask, 2.3 g. of titanium tetrachloride dissolved into 50 cc. of n-hexane was added, and the polymerization was carried out at the flow rate of ethylene of 11.6 l./hr. at 60° C. under atmospheric pressure. The resultant mass was worked up in the same manner as disclosed in Example 1. 24.6 g. of a white polymer was obtained, corresponding to 40% of polymerization conversion, and the viscosity number of the polymer was 3.11.

*Example 5*

6.4 g. of tellurium and 1.2 g. of magnesium were dissolved into 500 g. of n-hexane and 10.9 g. of ethyl bromide were added thereto. The mixture was shaken in ampule at 60° C. for three hours. The contents were transferred into a 500 cc. four-necked flask, into which 2.3 g. of titanium tetrachloride dissolved into 50 cc. of n-hexane was added. The polymerization was carried out at the ethylene flow rate of 11.6 l./hr. at 60° C. under atmospheric pressure for four hours. The polymerization product was worked up in the same manner as in Example 1. 2.82 g. of a white polymer was obtained, corresponding to 49% of polymerization conversion. The viscosity number of the polymer was 0.72.

*Example 6*

Into a 300 cc. volume autoclave, 1.0 g. of tellurium and 0.2 g. of magnesium dissolved into 30 g. of mercury were charged. Then 0.4 g. of titanium tetrachloride dissolved into 40 cc. of n-hexane was added, and the mixture was cooled to −70° C. Immediately thereafter, 21 g. of propylene was introduced and condensed therein. The polymerization was effected by shaking at 80° C. for 24 hours. The polymerization product was worked up in the same manner as in Example 1. 15.1 of a white polymer was obtained. The polymerization conversion attained 72%. The ether-insoluble part which was a crystalline polymer weighed 52%.

*Example 7*

Into a 300 cc. volume autoclave, 1.5 g. of bismuth-magnesium alloy (Bi, 85%; Mg, 15%) dissolved in 40 g. of mercury was charged. Then, 2.5 g. of ethyl bromide and 0.3 g. of titanium tetrachloride dissolved in 100 cc. of n-hexane were added. 21 g. of propylene was added in the same way as in Example 6. The polymerization was carried out at 80° C. for 24 hours. The product was worked up in the same manner as in Example 1. 9.5 g. of a white, solid polymer was obtained.

*Example 8*

Into a 300 cc. volume autoclave, 2.0 g. of lead-magnesium alloy (Pb, 80%; Mg, 20%) dissolved in 20 g. of mercury was charged. Then, 2.5 g. of ethyl bromide dissolved in 100 cc. of n-hexane was added. After further addition of 1.2 g. titanium trichloride, 21 g. of propylene was introduced in the same way as in Example 6. The polymerization was carried out at 80° C. for 24 hours. The polymerization product was worked up in the same manner as in Example 2, and 18.3 g. of a white, solid polymer was obtained. The polymerization conversion attained 87%, and the ether-insoluble part was 62%.

*Example 9*

6.0 g. of lead and 1.5 g. of magnesium were dissolved in 200 g. of mercury, and then 8.2 g. of ethyl bromide and 100 cc. of n-hexane were added. The total mixture was shaken in ampule at 60° C. for 3 hours. The contents of the ampule were transferred into a 500 cc. volume four-necked flask, into which 3.3 g. of zirconium tetrachloride suspended in 50 cc. of n-hexane was introduced. The polymerization of ethylene was carried out at the ethylene flow rate of 11.6 l./hr. at 60° C. for 4 hours under atmospheric pressure. The polymerization product was worked up in the same manner as in Example 2. 19.7 g. of a white polymer was obtained. The polymerization conversion was 34% and the viscosity number of the polymer was 0.94.

*Example 10*

4.0 g. of lead and 1.0 g. of magnesium were dissolved in 200 g. of mercury, and then 10 g. of ethyl bromide and 100 cc. of n-heptane were added. The mixture was charged into an ampule, which was then sealed by heat. The ampule was shaken at 60° C. for 5 hours. The contents were then transferred into a 500 cc. volume four-necked flash, into which then 50 cc. of n-heptane containing 2.0 g. of vanadium tetrachloride was introduced. The polymerization was carried out in the same manner as in Example 3. After 4 hours, the mercury phase was separated from the n-heptane phase (including the polymerization product) and then added with 4.0 g. lead, 1.0 g. magnesium and 10 g. ethyl bromide, 100 cc. n-heptane and further with 50 cc. of n-heptane containing 2.0 g. of vanadium tetrachloride. The polymerization was conducted for 4 hours with blowing ethylene under atmospheric pressure. The n-heptane phase separated was added with methanol and the polymerization product was recovered therefrom. The product was treated with methanol-hydrochloric acid and then methanol-nitric acid thereby to obtain a solid polymer, which corresponded to the polymerization conversion of 23%. The viscosity number was 0.9. From the lot which had been subjected to the further polymerization, 12.8 g. of a white solid polymer were obtained by repeating the same procedures as in Example 3. The viscosity number was 0.93.

*Example 11*

1.5 g. of lead-magnesium alloy (Pb, 80%; Mg, 20%) was dissolved into 20 g. of mercury, and then 2.1 g. of bromobenzene and 100 g. of toluene were added thereto. The total mixture was charged into an ampule which is then sealed by heat. This ampule was shaken at 80° C. for 5 hours. Then the content was transferred into a 300 cc. volume autoclave, in which a glass, small ampule containing 1.7 g. of chromium trichloride was inserted and then 21 g. of propylene was added. The autoclave was heated up to 100° C. and in the autoclave, the ampule was destroyed by mechanical action. The polymerization was effected for 24 hours, and then the product was worked up in the same manner as in Example 1 thereby to obtain 5.2 g. of a white polymer.

*Example 12*

1.5 g. of lead-magnesium alloy (Pb, 80%; Mg, 20%) was dissolved in 100 g. of mercury, and then 1.0 g. of ethyl bromide and 50 cc. of n-hexane were added. The total mixture was charged into an ampule which is then sealed by heat. The ampule was shaken at 60° C. for 5 hours, and the contents were transferred into a 500 cc. volume four-necked flash, into which a solution of 30 g. styrene in 150 cc. of benzene and a suspension of 0.6 g. titanium trichloride in 30 cc. of n-hexane were introduced. The polymerization was effected at 70° C. for 18 hours. At that time, the benzene phase became slightly viscous. After separation of the mercury phase, the benzene phase was poured into methanol thereby to separate the polymerizate, which was then treated with methanol-hydrochloric acid and then methanol-nitric acid. After washing and drying, 11.7 g. of a solid polymer was obtained. The polymer was treated with hot n-heptane for 12 hours and then extracted with cold methyl ethyl ketone for 24 hours. The extract residue was 3.05 g. The viscosity number of 0.1% benzene solution of the polymer was 1.8 at 30° C.

What is claimed is:

1. In a method for the polymerization of monomeric compounds selected from the group consisting of monoolefins with two to six carbon atoms and styrene, the improvement of polymerizing a monomeric compound of the aforesaid group in the presence of an inert solvent and of a catalyst consisting essentially of
   (1) at least one metal selected from the group consisting of tin, lead, bismuth and tellurium;
   (2) magnesium;
   (3) mercury in which said metal and magnesium are at least partly dissolved; and
   (4) at least one member selected from the group consisting of the trichlorides and tetrachlorides of titanium, zirconium, vanadium and chromium.

2. A method as claimed in claim 1, wherein said polymerization is carried out under a pressure between 1 atm. and 60 atm.

3. The improvement described in claim 1, wherein the said monomeric compound is polymerized at a temperature between 30° and 150° C.

4. The improvement described in claim 1, wherein the said monomeric compound is polymerized at a temperature between 50° and 120° C.

5. A method for preparation of a catalytically active composition suitable for polymerizing monomeric monoolefins, which comprises mixing 0.1 to 10 parts by mole of magnesium with one part by mole of at least one metal selected from the group consisting of lead, tin, bismuth and tellurium, adding to the mixture 0.1 to 500 times amount, based on the total weight of said mixture, of mercury, and then mixing the resulting solution or suspension with 0.1 to 10 parts by mole of at least one member selected from the group consisting of the tri- and tetrachlorides of titanium, zirconium, vanadium and chromium.

6. A method as claimed in claim 5, wherein the catalytically active composition is prepared in the presence of the monomer to be polymerized.

7. A method for preparation of a catalytically active composition suitable for polymerizing monomeric monoolefins, which comprises mixing 0.1 to 10 parts by mole of magnesium with one part by mole of at least one metal selected from the group consisting of lead, tin, bismuth and tellurium, adding to the mixture 0.1 to 500 times amount, based on the weight of said mixture, or mercury, mixing the resulting solution or suspension with less than 10 parts by mole of ethyl bromide in an inert solvent, and then adding to the resulting suspension 0.1 to 10 parts by mole of at least one member selected from the group consisting of the tri- and tetrachlorides of titanium, zirconium, vanadium and chromium.

8. A method for preparation of a catalytically active composition, which comprises mixing lead and magnesium with a sufficient amount of mercury to dissolve at least one portion of said lead and magnesium therein, and then adding to the resultant mass titanium tetrachloride.

9. A method for preparation of a catalytically active composition, which comprises mixing lead and magnesium with a sufficient amount of mercury to dissolve at least one portion of said lead and magnesium therein, and then adding to the resultant mass ethyl bromide and titanium tetrachloride.

10. In a method for the polymerization of monomeric compounds selected from the group consisting of monoolefins with two to six carbon atoms and styrene, the improvement of polymerizing a monomeric compound of the aforesaid group in the presence of an inert solvent and of a catalyst consisting essentially of
    (1) at least one metal selected from the group consisting of tin, lead, bismuth and tellurium;
    (2) magnesium;
    (3) mercury in which said metal and magnesium are at least partly dissolved;
    (4) at least one member selected from the group consisting of the trichlorides and tetrachlorides of titanium, zirconium, vanadium and chromium; and
    (5) at least one member selected from the group consisting of the monohalo alkyls with one to four carbon atoms and bromobenzene.

11. The improvement described in claim 10, wherein the monomeric compound is ethylene.

12. The improvement described in claim 10, wherein the monomeric compound is propylene.

13. The improvement described in claim 10, wherein the monomeric compound is styrene.

14. The improvement described in claim 10, wherein the member under (5) is ethylbromide.

15. The improvement described in claim 10, wherein the inert solvent is at least one member selected from the group consisting of n-hexane, n-heptane, benzene and toluene.

16. A catalytically active composition suitable for polymerizing monomeric monoolefins, consisting essentially of a mixture of
    1 molar equivalent of at least one metal selected from the group consisting of lead, tin, bismuth and tellurium;
    0.1 to 10 molar equivalents of magnesium;
    0.1 to 500 times the total weight of said metal and magnesium of mercury;
    0.1 to 10 molar equivalents of at least one member selected from the group consisting of the dichlorides and tetrachlorides of titanium, zirconium, vanadium and chromium, and from
    0 to 10 molar equivalents of at least one member selected from the group consisting of the monohalo alkyls with one to four carbon atoms and bromobenzene.

References Cited in the file of this patent

UNITED STATES PATENTS 2,899,418 Reynolds _____ Aug. 11, 1959